United States Patent [19]
Mishler

[11] 3,726,146
[45] Apr. 10, 1973

[54] GYROSCOPIC DEVICE

[75] Inventor: Archie L. Mishler, Clackamas, Oreg.

[73] Assignee: Wornoto Incorporated, Williamia, Oreg.

[22] Filed: Apr. 12, 1971

[21] Appl. No.: 133,259

[52] U.S. Cl. .............................. 74/5, 46/50, 74/5.7
[51] Int. Cl. ............................................. G01c 19/04
[58] Field of Search .................... 46/50, 209; 74/5.7, 74/5, 5.4

[56] References Cited

UNITED STATES PATENTS

| | | | |
|---|---|---|---|
| 1,075,770 | 10/1913 | Darrow | 74/5.7 |
| 3,157,053 | 11/1964 | Hall | 74/5.7 X |
| 1,647,148 | 11/1927 | Rosenman | 74/5.7 X |

FOREIGN PATENTS OR APPLICATIONS

| | | | |
|---|---|---|---|
| 319,939 | 8/1902 | France | 46/50 |

*Primary Examiner*—Manuel A. Antonakas
*Attorney*—Buckho, Blore, Klarquist & Sparkman

[57] ABSTRACT

A rotor is positioned in a support structure which has an internal circular portion provided with an internal groove. The rotor is mounted on a shaft extending diametrically across the circular portion with its ends received in the groove. A ring is positioned in the groove so as to be rotatable circumferentially of the groove. The ring has diametrically spaced notches in its inner periphery also receiving the ends of the rotor shaft for maintaining them 180° apart in the groove. The rotor can thus rotate about the axis of the rotor shaft as a first or spin axis and also about the axis of rotation of the ring which constitutes a second axis at right angles to and intersecting the spin axis. By giving the rotor an initial spin and then holding the support structure in the hand and manually applying a torque to the support structure and a third axes at right angles to both the spin and second axis, the rotor will precess about the second axis and produce a torque about the third axis opposing the manually applied torque. By manually gyrating the axis of the applied torque about the second axis at the same rate and in the same direction as the precession of the rotor, the opposite ends of the rotor shaft are continuously pressed against the opposite sides of the groove by the opposing torques and the precession is continuous and causes the ends of the rotor shaft to roll on the sides of the groove in a direction which increases the rate of spin of the rotor. A skillful operator can cause the rotor to attain high speed of rotation about its spin axis.

9 Claims, 6 Drawing Figures

PATENTED APR 10 1973 3,726,146

ARCHIE L. MISHLER
INVENTOR

BY
BUCKHORN, BLORE, KLARQUIST & SPARKMAN
ATTORNEYS

GYROSCOPIC DEVICE

BACKGROUND OF THE INVENTION

A considerable number of gyroscopic devices have been provided in the past. Most of them have included a balanced rotor mounted upon a shaft which is journaled at its ends in bearings in fixed positions in a ring or housing. The rotors of these devices have, for example, been given a high rate of spin about the axis of the rotor shaft by pulling a string wrapped around the shaft or rolling along a stationary surface a small roller on a projecting end of the shaft. As long as the rotor continues to rapidly spin, it will precess so that an end of its shaft travels in a horizontal circle when the device is supported at a point which is laterally displaced from the center of gravity of the device and in a vertical plane passing through the axis of the rotor.

SUMMARY OF THE INVENTION

In the gyroscopic device of the present invention, the rotor of the device can rotate in a support structure, not only about its spin axis, but also about a second axis at right angles to such spin axis. In addition, the structure providing the rotation about the second axis includes two circular tracks concentric with the second axis with one of the tracks positioned on each side of the ends of the rotor shaft so that these ends of the rotor shaft can engage and roll upon the surfaces of the tracks. The tracks form part of a support structure in the form of an annulus or a housing surrounding the gyroscopic rotor and such support structure also includes mechanism by which the ends of the shaft are maintained 180° apart on the tracks.

By grasping the support structure in the hand and applying a torque about a third axis at right angles to both the spin axis and the second axis, the rotor is caused to precess about the second axis in a direction which tends to bring the spin axis into coincidence with the third axis and also causes the direction of rotation of the rotor about the spin axis to be the same as the direction of the applied torque. This precession produces a gyroscopic torque about the third axis resisting the applied torque so that one end of the rotor shaft is pressed into contact with one of the tracks and the other end pressed into contact with the other track. The precession of the rotor about the second axis is in a direction which causes the ends of the rotor shaft to roll on the surfaces of the tracks in a direction which increases the speed of rotation of the rotor about its spin axis. By manually gyrating the axis of applied torque about the second axis in the same direction and the same speed as the precession of the rotor about such axis, a continuous accelerating torque is applied to the rotor about its spin axis due to such precession of the rotor and the rolling of the ends of the rotor shaft upon the tracks.

The opposing or resisting torque referred to can be sensed by the operator and he soon learns to gyrate the supporting structure so as to keep the opposing torque at a substantially constant maximum value. This occurs when the axis of the applied torque is maintained substantially perpendicular to both the spin axis of the rotor and to the axis of precession of the rotor, and thus in direct opposition to the torque caused by precession of the gyroscopic rotor. Except for very small resisting torques due to the inertia of the rest mass of the device, the applied torque is, of course, exactly equal to the resisting torque produced by precession of the rotor. In any event, the operator soon learns to control the gyration of the support structure of the device in accordance with the resisting forces he feels so that the rotor attains a high speed of rotation about its spin axis.

When the rotor has reached this high speed of spin, gyroscopic device becomes an active element when held in the hand. When the device is held lightly between the fingers adjacent diametrically opposite points of the tracks of the support structure, the rotor will, however, usually stop precessing and the device is passive. Any attempt to hold the device rigidly in position by grasping it firmly with the hand will usually result in the application of at least a slight torque about the third axis. This causes precession of the rotor producing a gyrating torque operating against the instinctive resistance to movement provided by the hand so that the rotor continues to precess and the device gyrates in the hand. Any time the rotor tends to slow down, it can again be speeded up by the manual application of the gyrating torque above discussed.

It is therefor an object of the present invention to provide a new gyroscopic device in which the rotor can not only rotate about its spin axis but can also rotate about a second axis at right angles to the spin axis, and in which the rotor can be made to increase in speed by applying a torque about a third axis to cause the rotor by precess about the second axis and then manually gyrating the axis of the applied torque about the second axis at a rate equal to the rate of precession of the rotor.

DESCRIPTION OF THE PREFERRED EMBODIMENTS OF THE INVENTION

Figure 1:
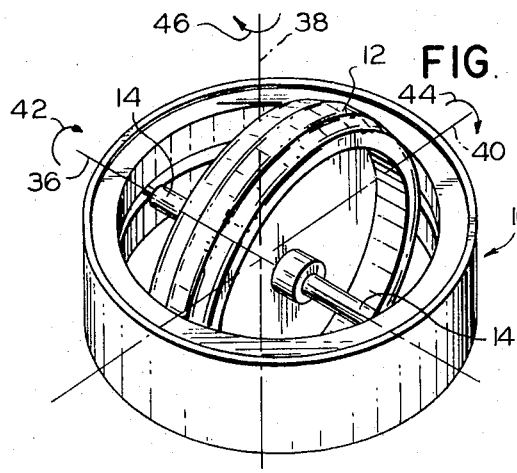
FIG. 1 is an isometric view of a device in accordance with the present invention.
Figure 2:
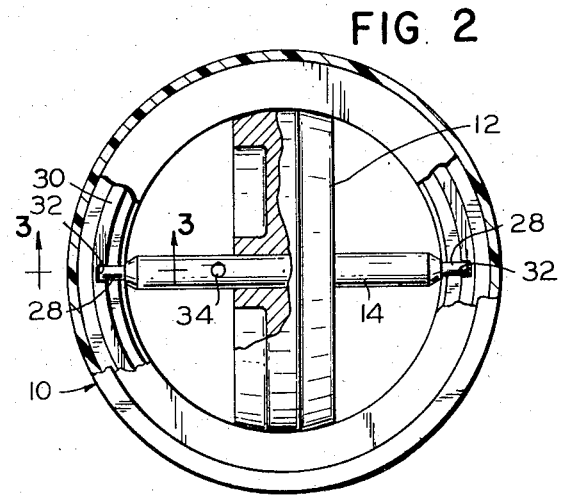
FIG. 2 is a plan view of the body of FIG. 1 with parts broken away to show internal structure.
Figure 3:
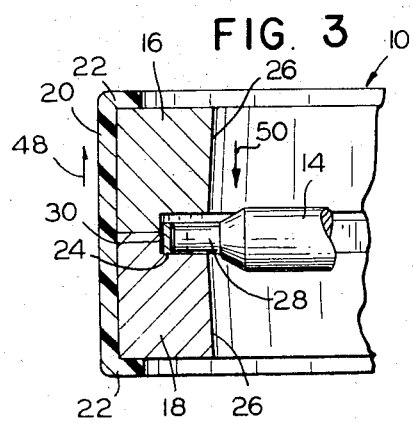
FIG. 3 is a fragmentary sectional view on an enlarged scale taken on the line 3—3 of FIG. 2.

The gyroscopic device shown in FIGS. 1,2 and 3 includes a support structure 10 and a rotor 12 mounted upon a rotor shaft 14 providing a spin axis for the rotor 12.

As shown in FIG. 3, the support structure 10 may include two identical ring members 16 and 18 positioned so as to be concentric with each other and have adjacent side surfaces abutting each other. The ring members 16 and 18 are secured together by a retaining ring 20 extending circumferentially around the ring members 16 and 18 and having edge flanges 22 holding the ring members together. The retaining ring 20 may, for example, be made of thermoplastic material which is heat softened and the flanges 22 formed by pressing around the edges of the ring members 16 and 18, or may be metal ring having the flanges 22 spun around the outside edges of the members 18, or the flanges 22 may be omitted and the retaining ring 20 adhesively secured to the ring members 16.

The ring members 16 each has a groove in an inner side corner which provide a circular groove 24 in an inner circular portion 26 of the support structure 10. The ends 28 of the rotor shaft 14 are reduced in diameter and are received in the groove 24 with a loose fit so that these ends can make rolling contact with the side surfaces of the groove 24. These side surfaces of the groove thus form circular tracks for the ends 28 of the shaft, the tracks being positioned on opposite sides of such ends. The groove 24 also contains a ring element 30 which fits the groove 24 with sufficient clearance that it can rotate circumferentially of the ring element in the groove 24. The ring element 30 has diametrically spaced notches 32, shown most clearly in FIG. 2, which receive the reduced ends 28 of the rotor shaft 14. It will be apparent that the ring element 30 and notches 32 permit the rotor to rotate about the central axis of the ring element while maintaining the ends of the rotor shaft 14 spaced 180° apart in the groove 24. As shown in FIG. 3, the inner peripheral surfaces of the ring members 16 and 18 may be frusto conical or spherical to provide a support member of minimum size and at the same time provide clearance for the rim of the rotor 12 shown in FIGS. 1 and 2.

It will be apparent that the rotor 12 of FIGS. 1 and 2 can be given an initial spin by holding the support structure 10 of the device in one hand and rapidly moving the other hand in a direction perpendicular to the shaft 14 in a path which engages the palm of the hand with the rim of the rotor. Alternatively the shaft 14 may have a hole 34 extending diametrically through the shaft as shown in FIG. 2 and one end of a string may be inserted through such hole and the string wrapped around the shaft. Pulling the string will then spin the rotor 12.

The outer peripheral surface of the support structure 10 can then be grasped between the thumb and fingers, preferably with the shaft 14 of the rotor 12, i.e., the spin axis of the rotor, in a substantially horizontal position and the hand above the device. The support structure 10 can then be manually given a gyrating motion in either direction so that the movement of the second axis 38, i.e., the axis of rotation of the ring element 30 in the groove 24, follows approximately the surface of a cone having its apex above the device. A resisting torque due to precession of the rotor 12 about the second axis will be felt whenever the manual torque producing the gyrating motion has a substantial component about a third axis 40 at right angles to both the first or spin axis 36 of the rotor and the second or precession axis 38 of the rotor. The axis 40 of any resisting torque thus gyrates with the rotor in its precession about the second axis 38 and if the gyrating movement given to the support structure 10 is such that a torque supplied by the operator is also gyrated about such second axis 38, at the same rate as the precession of the rotor about the second axis, the rotation of the rotor about the spin axis 36 of the shaft 14 will increase. The operator feels the torque produced by precession of the spinning rotor 12 and soon learns to apply a torque about the third axis 40 which gyrates about the second axis 38 at the same rate as the precession of the rotor 12 about such second axis 38 so that the gyrating torque applied by the operator is constantly resisted by an opposing torque about the third axis 40 resulting from the precession of the rotor 12 about the second axis.

As is well known, if the rotation about the spin axis 36 is in the direction of the arrow 42 in FIG. 1, applying a torque about the third axis 40 in the direction of the arrow 44 in FIG. 1 will cause the rotor 12 to precess about the second axis 38 in the direction of the arrow 46 in FIG. 1, since the spinning rotor of the gyroscope will always precess in a direction about the second axis 38 which tends to cause its spin axis 42 to align with the third axis 40 about which the torque is applied so that rotation of the rotor about its spin axis 36 is in the same direction as the application of the torque about the third axis 40. This precession of the rotor produces the resisting torque about the second axis 40 which opposes the applied torque indicated by the arrow 44.

The left-most end of the rotor shaft 14 in FIG. 1 is shown in FIG. 3. The direction of the force applied to the end 38 of the rotor shaft through the support structure 10, due to the applied torque shown by the arrow 44 in FIG. 1, is indicated by the arrow 48 in FIG. 3. The equal resisting force exerted by the left-most end 28 of the rotor shaft 14 due to resulting precession of the rotor 12 is indicated by the arrow 50 in FIG. 3. These two opposing forces indicated by the arrows 48 and 50 cause the left-most end 28 of the shaft 14 to be pressed against the lower surface of the groove 24 in FIG. 3. It will be apparent from FIGS. 1 and 3, that the precession of the rotor shaft about the axis 38 of FIGS. 1 in the direction of the arrow 46 and the opposing forces indicated by the arrows 48 and 50 will cause rolling of the left-most end 28 of the shaft 14 on such lower surface of the groove 24. Throughout wide ranges of diameters of the end 28 of the shaft 14 and wide ranges of rates of rotation of the rotor 12 about its spin axis 36, this rolling will cause the rate of rotation of the shaft 14 and rotor 12 about such spin axis in the direction of the arrow 42 of FIG. 1 to increase. An exactly similar action takes place at the other end 28 of the rotor shaft 14 to cause such end to be pressed against the upper or opposite side of the groove 24 such that precession of the rotor 12 in the direction of the arrow 46 of FIG. 1 will cause the other end of the shaft 14 to roll in the opposite direction on such upper surface to thus also aid in causing the rotation of the rotor about its spin axis to increase.

This increase in the speed of rotation of the rotor about its axis produces a torque on the rotor about the second axis 38 transmitted from the support structure 10 through the ends 28 of the rotor shaft 14. This torque resists the above described precession of the rotor 12 about the second axis 38. An equal opposing torque is produced by the rotor by precession of the rotor also about the third axis 40 in the direction of the arrow 44. This means that the torque applied manually to the support structure 10 about the axis 40 in the direction of the arrow 44 and resisted by a torque resulting from precession of the rotor about the second axis 38, does cause some rotation of the support structure about the axis 40 in the direction of the arrow 44. Work is thus performed by the operator to increase the energy of rotation of the rotor 12. By practice an operator can cause the rotor 12 to attain a high rate of rotation about its spin axis 36. As the rate of rotation of the rotor about its spin axis increases, the opposing torque felt by the operator and the required rate of gyration of the support structure 10 both increase until the operator no longer has the strength or agility to further increase the rotation of the rotor about its spin axis.

Figure 4:
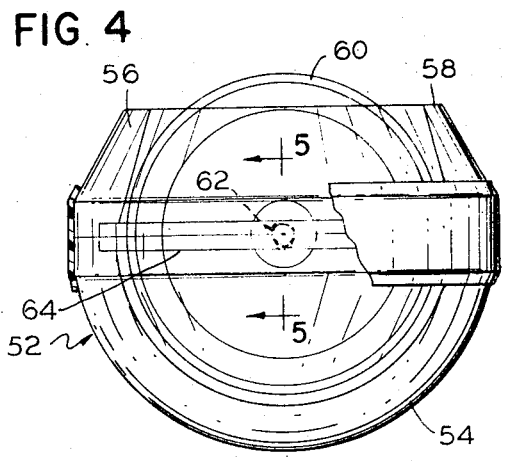
FIG. 4 is a side elevation of a modified structure having a transparent housing.

A modification of the support structure for the gyroscopic device is shown in FIG. 4. Thus the support structure may be in the form of a housing 52 which may, for example, be made of transparent material illustrated in FIG. 4. The support structure may have one element 54 which is substantially semispherical and another element 56 which is ring-shaped and has an open top portion 58 providing access to a rotor 60 in order to enable the rotor to be given an initial spin.

Figure 5:
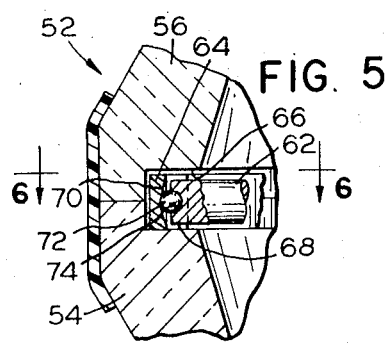
FIG. 5 is a vertical sectional view on an enlarged scale taken on the line 5—5 of FIG. 4.
Figure 6:
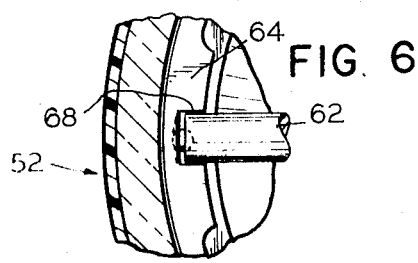
FIG. 6 is a sectional view taken on the line 6-6 of FIG. 5.

A modified structure for supporting the ends of the rotor shaft 62 is shown in FIGS. 5 and 6. This structure includes a ring element 64 positioned in a groove 66 formed between the support elements 54 and 56 in the same manner as the groove 24 of FIGS. 1 to 3. The ring element is provided with notches 68, each having a conical bottom end surface 70 in which a bearing ball 72 is positioned. The ends of the shaft 62 are each provided with a socket 74 receiving and fitting the other side of the bearing ball 72. The ring element 66 has sufficient resiliency that, under conditions in which there is substantially no torque exerted between the ends of the rotor shaft 62 and the support structure 52, the ends of the shaft 62 are held in the position shown in FIGS. 5 and 6 so that these ends of the shaft are out of contact with the side surfaces of the groove 66 in the support structure 52 and out of contact with the sides of the notches 68. This provides an antifriction bearing for the rotor shaft 62 under these conditions so that the rotor continues to spin for a greater length of time than in the structure of FIGS. 1 to 3. The resiliency of the ring 66 is, however, such that any substantial torque between the ends of the rotor shaft and the support structure about an axis corresponding to the axis 40 of FIG. 1, will cause the ball 72 to move from its central position shown in FIG. 5 so that the shaft 62 can contact the side surfaces of the groove 66 to cause the device to operate in exactly the same manner as the device shown in FIGS. 1, 2 and 3. It will be apparent that the bearing structure shown in FIGS. 5 and 6 can be employed in the device of FIGS. 1, 2 and 3 as well as the device of FIG. 4, and that the support structure for the rotor may have any desired outer shape including a spherical shape with a cover for completing the spherical shape.

I claim:

1. A gyroscopic device comprising:
a balanced gyroscopic rotor having a shaft providing a spin axis for said rotor;
support means for said rotor including housing means extending continuously around said rotor and enclosing at least a portion of the rotor and also including means for receiving the ends of said shaft for rotation of said rotor about said spin axis and providing for rotation of said rotor relative to said support means about a second axis at right angles to said spin axis;
said housing means including continuous circular track means concentric with said second axis and positioned on opposite sides of and adjacent the ends of said shaft means for rolling contact by the ends of said shaft when a torque is applied to said support means about a third axis at right angles to both said spin and second axis to cause precession of said rotor about said second axis.

2. The device of claim 1 in which:
said support means includes means for maintaining the ends of said shaft spaced 180° apart on said track means.

3. A gyroscopic device comprising:
a balanced gyroscopic rotor having a shaft providing a spin axis for said rotor;
support means for said rotor including means for receiving the ends of said shaft for rotation of said rotor about said spin axis and providing for rotation of said rotor relative to said support means about a second axis at right angles to said spin axis;
said support means including circular track means concentric with said second axis and positioned on opposite sides of and adjacent the ends of said shaft means for rolling contact by the ends of said shaft when a torque is applied to said support means about a third axis at right angles to both said spin and second axis to cause precession of said rotor about said second axis;
said support means also including means for maintaining the ends of said shaft spaced 180° apart on said track means;
the support means also having a circular interior portion and the means for receiving the ends of said shaft including an internal groove in said circular portion concentric with said circular portion, and having sides providing said tracks.

4. The device of claim 3 in which:
said support structure has a ring element positioned in said groove for rotation in said groove about said second axis;
and said ring has diametrically spaced notches in its inner periphery also receiving the ends of said shaft for maintaining said ends of said shaft spaced 180° apart in said groove.

5. The device of claim 4 in which:
said support means includes an annular shaped member surrounding said rotor and concentric with said second axis and also having said groove in its inner surface.

6. The device of claim 4 in which:
said support means is a housing enclosing at least the major portion of said rotor.

7. The device of claim 4 in which:
said support means has bearing means for holding the ends of said shaft out of contact with said tracks when substantially no torque about said third axis is applied to said support means and for permitting the ends of said shaft to engage said tracks when substantial torque is applied to said support means about said third axis.

8. The device of claim 7 in which:
said bearing means includes a bearing ball at each end of said shaft;
said ends of said shaft each having a socket for maintaining a corresponding bearing ball centrally of said shaft and the bottom of each of said notches in said ring having a conical socket for receiving said corresponding bearing ball;

said device including resilient means for resiliently urging said conical sockets and the corresponding balls toward each other axially of said shaft to resiliently urge said shaft away from the sides of said groove and said notches.

9. The device of claim 8 in which said ring constitutes said resilient means.

* * * * *